US010791071B2

(12) United States Patent
Cacioppo et al.

(10) Patent No.: US 10,791,071 B2
(45) Date of Patent: *Sep. 29, 2020

(54) FILE-LEVEL COMMENTS IN COLLABORATIVE CONTENT ITEMS

(71) Applicant: Dropbox, Inc., San Francisco, CA (US)

(72) Inventors: Christina Cacioppo, San Francisco, CA (US); Lars Johnson, San Francisco, CA (US); Igor Kofman, San Francisco, CA (US); Khurram Zia, Sunnyvale, CA (US); Sheila Ramaswamy, San Francisco, CA (US); John R. Grace, Jr., San Francisco, CA (US); Kevin Tunc, San Francisco, CA (US); Eric Sheng, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,225

(22) Filed: Sep. 20, 2019

(65) Prior Publication Data

US 2020/0028806 A1    Jan. 23, 2020

Related U.S. Application Data

(63) Continuation of application No. 15/445,406, filed on Feb. 28, 2017, now Pat. No. 10,462,077.
(Continued)

(51) Int. Cl.
*H04L 12/58* (2006.01)
*H04L 29/08* (2006.01)

(52) U.S. Cl.
CPC .............. *H04L 51/04* (2013.01); *H04L 67/06* (2013.01); *H04L 67/1097* (2013.01)

(58) Field of Classification Search
CPC ...... H04L 51/04; H04L 67/1097; H04L 67/06
See application file for complete search history.

(56) References Cited

U.S. PATENT DOCUMENTS 7,945,653 B2    5/2011   Zuckerberg et al.
2011/0219083 A1  9/2011   Nishi
(Continued)

OTHER PUBLICATIONS

United States Office Action, U.S. Appl. No. 15/445,406, dated Jun. 18, 2019, 24 pages.
(Continued)

*Primary Examiner* — Arvin Eskandarnia
*Assistant Examiner* — Chhian (Amy) Ling
(74) *Attorney, Agent, or Firm* — Fenwick & West LLP

(57) ABSTRACT

A collaborative content management system enables users to selectively create file-level comments, in addition to content level comments, in collaborative content items. A file-level comment can be created in a number of different ways, including creating a comment associated with a title, header, heading, or other designated portion of the content; by designating a message associated with sharing the content item as a file-level comment; by replaying via a messaging system to a message sharing the content item; or by including a file-level primitive in the content of a comment. A file-level comment may be indicated in the collaborative content item by visually distinguishing formatting of a title, header or other portion of the content item. A file-level comment may be displayed in a visually distinctive manner, such as with specified formatting or in a specific window pane apart from content level comments.

20 Claims, 16 Drawing Sheets

Related U.S. Application Data

(60) Provisional application No. 62/440,360, filed on Dec. 29, 2016.

(56) References Cited

U.S. PATENT DOCUMENTS

| | | |
|---|---|---|
| 2013/0124455 A1 | 5/2013 | Goodson et al. |
| 2013/0147845 A1 | 6/2013 | Xie et al. |
| 2013/0262593 A1 | 10/2013 | Srikrishna et al. |
| 2016/0188301 A1 | 6/2016 | Zang et al. |
| 2017/0257406 A1 | 9/2017 | Wilde et al. |
| 2017/0285890 A1 | 10/2017 | Dolman |
| 2018/0121371 A1 | 5/2018 | Lillibridge et al. |

OTHER PUBLICATIONS

United States Office Action, U.S. Appl. No. 15/445,406, dated Mar. 1, 2019, 25 pages.
United States Office Action, U.S. Appl. No. 15/445,406, dated Nov. 19, 2018, 18 pages.

530—

Draft Speech — 531

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate – we can not consecrate – we can not hallow, this ground – The brave men, living and dead, who struggled here, have hallowed it, far above our poor power to add or detract. The world will little note, nor long remember what we say here, while it can never forget what they did here.

---

Share

New Comment...   Comments (7)

John Nicolay   12/16/10 at 8:25 am
I like this version better than the first draft. @file
Reply

528

Edward Everett   12/15/10 at 11:05 pm
You say in two minutes what would take me two hours. Well done.

Bill Seward   12/15/10 at 11:10 pm
Certainly the bloodiest...
2 more comments

John Hay   12/15/10 at 11:1pm
What happened to "It is altogether fitting and proper that we should do this." ???
Reply George Bancroft   12/15/10 at 11:05 pm
I would like to use this in fundraising for soliders.
@Bill_Seward your thoughts?
Reply

*FIG. 5B*

Draft Speech

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate – we can not consecrate – we can not hallow, this ground – The brave men, living and dead, who struggled here, have hallowed it, far above our poor power to add or detract. The world will little note, nor long remember what we say here; while it can never forget what they did here.

---

Share

| Content-Level | File-Level |

New Comment...

Comments (6)

Edward Everett  12/15/10 at 11:05 pm
You say in two minutes what would take me two hours. Well done.

Bill Seward  12/15/10 at 11:10 pm
Certainly the bloodiest...
        2 more comments John Hay  12/15/10 at 11:13pm
What happened to "It is altogether fitting and proper that we should do this." ???
Reply George Bancroft  12/15/10 at 11:05 pm
I would like to use this in fundraising for soliders.
@Bill_Seward your thoughts?
Reply

Draft Speech

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate – we can not consecrate – we can not hallow, this ground – The brave men, living and dead, who struggled here, have hallowed it, far above our poor power to add or detract. The world will little note, nor long remember what we say here, while it can never forget what they did here.

| Content-Level | File-Level | Share |
|---|---|---|

New Comment...

John Nicolay   12/15/10 at 11:05 pm
I like this version better than the first draft.

George Bancroft   12/15/10 at 11:09 pm
Did anyone check the math re 4 score + 7? @file Reply 534 — Content-Level
536 — File-Level
538 — Comments (2)
532

*FIG. 5D*

Draft Speech

Here is the draft of the speech. @Bill_Sew[ard] @John Hay, please comment. 548

"Four score and seven years ago our fathers brought forth, upon this continent, a new na[tion] conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate – we can not consecrate – we can not hallow, this ground – The brave men, living and dead, who struggled here, have hallowed it, far above our poor power to add or detract. The world will little note, nor long remember what we say here; while it can never forget what they did here.

---

Share

To: Edward Everett  ▼ Can Edit

Please be sure to leave time at the end for the POTUS to speak. You have a penchant for superfluidity.

▼ Post message as comment

Edward Everett  12/15/10 at 11:05 pm
You say in two minutes what would take me two hours. Well done.

Bill Seward  12/15/10 at 11:10 pm
Certainly the bloodiest...
— 2 more comments —

John Hay  12/15/10 at 11:1pm
What happened to "it is altogether fitting and proper that we should do this." ???
Reply George Bancroft  12/15/10 at 11:05 pm
I would like to use this in fundraising for solider.
@Bill_Seward your thoughts?
Reply

Recent docs — Created by me — Search — Shared with m...

620

606A Draft Speech
Shared with Edward Everett and Bill Seward · You viewed 5 day...

606B Draft Opinion: Gibbons v. Ogden
Shared with John Marshall · You viewed 7 days ago · Edited 7 da...

606C A Brief History of Steel Production in Ohio
Shared with Robert Jackson · You viewed 10 days ago · Edited 1...

606D Proposed Footnote for Carolene Products Opi...
Shared with Harlan F. Stone · You viewed 13 days ago · Edited...

606E The Effects of Education on Interstate Comme...
Shared with William Rehnquist · You viewed 14 days ago · Edite...

604

Draft Opinion: Gibbons v. Ogden
John Marshall commented — 1 day ago
How do you like this ending?

John Marshall commented — 2 days ago
The enumeration . . . .

John Marshall commented — 2 days ago
Please edit this part

A Brief History of Steel Production in Ohio
Robert Jackson commented — 4 days ago
I see a zone of twilight.

Robert Jackson commented — 5 days ago
What does Hugo think about this?

Draft Speech
George Bancroft commented — 5 days ago
@Bill Seward your thoughts?

616

File Level Comments

John Nicolay   12/15/10 at 11:05 pm
I like this version better than the first draft George Bancroft   12/15/10 at 11:09 pm
Did anyone check the math re 4 score + 7? @file

618

Reply 602
608  610  612  614

FIG. 6

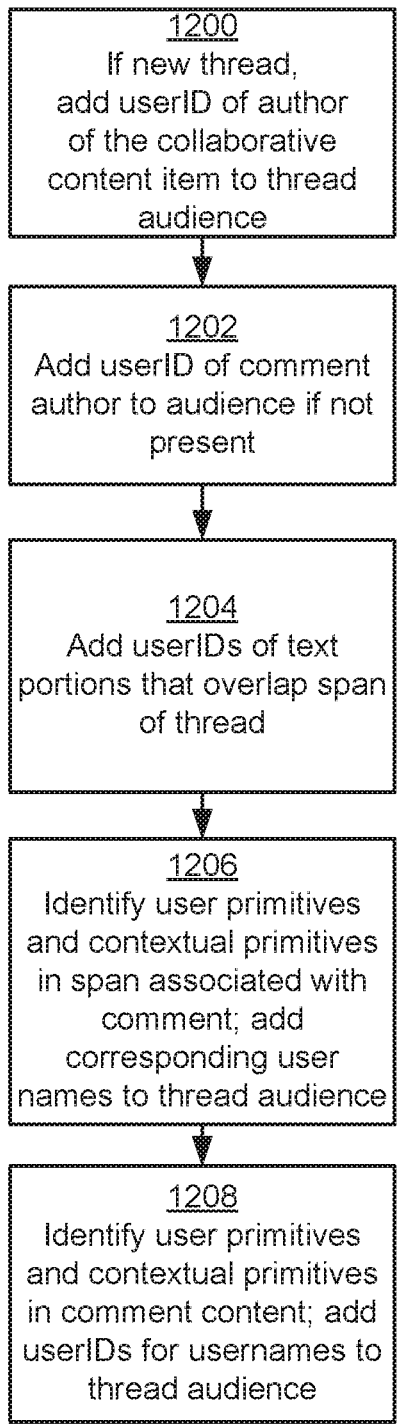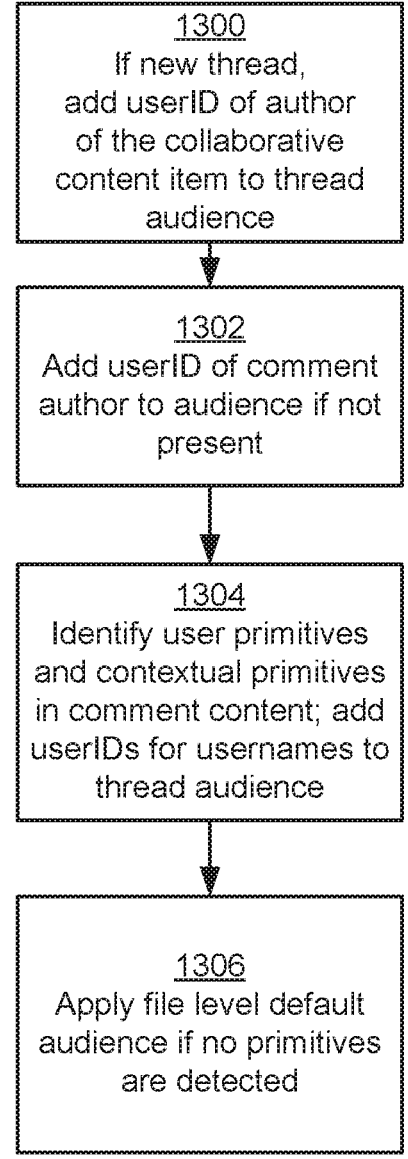
FIG. 12
FIG. 13

FILE-LEVEL COMMENTS IN COLLABORATIVE CONTENT ITEMS

CROSS REFERENCE TO RELATED APPLICATIONS

This application is a continuation of U.S. application Ser. No. 15/445,406, filed Feb. 28, 2017, now U.S. Pat. No. 10,462,077, which application claims the benefit of U.S. Provisional Application No. 62/440,360, filed on Dec. 29, 2016, all of which are incorporated by reference in their entirety.

TECHNICAL FIELD

The disclosed embodiments generally relate to managing file-level comments in collaborative content items over a network.

BACKGROUND

Online collaborative sharing of documents is typically provided by a network-based file sharing computer system that allows multiple users to access and edit the files. Generally, documents are created and edited by a specific type of native application, such as a word processor or spreadsheet application. Many such applications provide support for tracking comments or other forms of annotation made to portions of a file, such as comments on words, sentences or paragraphs in a document, or cells in a spreadsheet. In these applications, if the portion of the document that is commented upon is deleted, the attached comments are deleted as well. However, existing systems do not provide native programmatic functionality that enables users to create comments or annotations that apply to the entire document, that persist independently of comments made within the file, or that persist when underlying portions of the file are deleted.

SUMMARY

A collaborative content management system allows users to create, edit, and share collaborative content items among a plurality of other users. A collaborative content item can include various types of content such as text, images or other multi-media, tables, etc. Users can communicate with the collaborative content management system using a client application on a client device or through a web application. The client application provides an interface for users to access collaborative content items on the collaborative content management system, edit such collaborative content items, comment on collaborative content items and share collaborative content items with other users.

A collaborative content management system enables multiple levels of commenting. The collaborative content management system enables a file-level commenting system. A file-level comment is a comment associated with a content item file, rather than being associated with a particular portion of content within the content item file. A file is any self-contained piece of work created with an application program. A file can be an item in a file system, in a database, or another item in a storage scheme. A file-level comment persists in association with the content item file until the content item file is deleted or the comment itself is deleted. This allows for conversations between users regarding shared content item files to occur on a file-level that persist with each iteration on the file. In some implementations, a collaborative content item can include both file level comments and content level comments (e.g., comments associated with specific content of the collaborative content item). This allows two distinct levels of conversations to occur between users of the files.

A single collaborative content item can have one or more comments of either comment level. For example, a content item may have a series of file-level comments while also having another thread of content level comments associated with a selected portion of the collaborative content item. A comment, irrespective of its level designation, can be associated with an author and can have content such as text, images, links, tags, etc.

The collaborative content management system allows users to share collaborative content items with additional users by sending a sharing invitation over email or other electronic messaging formats. The collaborative content management system may provide a sharing icon, wherein upon selection of the sharing icon, the collaborative content management system, allows the user to input a message to send with the sharing invitation for the collaborative content item. Oftentimes, the sharing invitation initiates a conversation between the user and recipients of the sharing invitation about the collaborative content item, so the user may wish to include the sharing invitation message as a file-level comment associated with the collaborative content item. For this reason, the collaborative content management system provides the user with an option to include the sharing invitation message as a file-level comment. When the user selects this option the sharing invitation is sent over email and the content of the sharing message is also stored as a file-level comment associated with the shared content item.

The collaborative content management system may also store any replies to the sharing invitation message as a file-level comment. When sending the sharing invitation, the collaborative content management system may include an anonymized token code in the sending address of the sharing invitation. If a recipient of the sharing invitation replies to the invitation, the collaborative content management system detects the anonymized token code and saves the reply as a file-level comment associated with the shared collaborative content item.

The collaborative content management system may also create content level comments. To create a content level comment, the collaborative content management system receives from the client device a selection of content, for example one or more words, lines, media items, list items, table portions, paragraphs, etc., along with an instruction to create a comment for the selected portion. The collaborative content management system creates a new thread and assigns the user identifier of the user to the author element of the thread. The collaborative content management system receives from the client application the content for the comment and inserts that content into the comment. The collaborative content management system stores the collaborative content item, the thread, and the new comment in the collaborative content item database.

The present invention has embodiments in a client device and client application, a collaborative content management system, computer program products, and computer implemented methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5B shows an example user interface with a file-level comment associated with the title of the collaborative content item.

FIG. 5C shows an example user interface including separate content level and file-level tabs with the content level tab displayed.

FIG. 5D shows an example user interface including separate content level and file-level tabs with the file-level tab displayed.

FIG. 5E shows an example user interface illustrating a sharing interface for sharing a content item and creating an associated file-level comment.

FIG. 6 shows an example user interface with a plurality of collaborative content items, a list of notifications, and file level comments.

FIG. 12 shows one embodiment of an algorithm for identifying an audience for a content level thread.

FIG. 13 shows one embodiment of an algorithm for determining an audience for a file-level thread.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
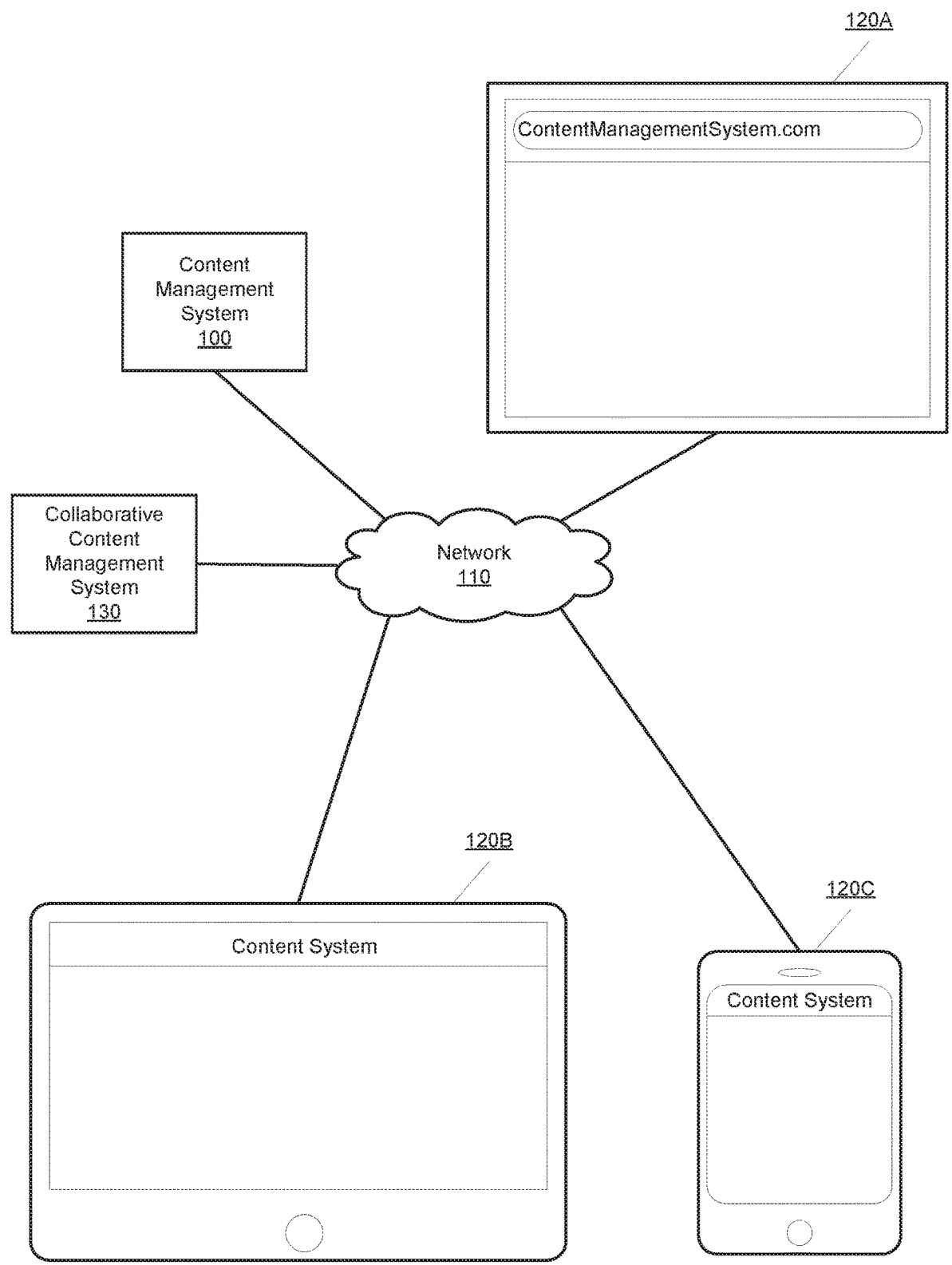
FIG. 1 shows a diagram of a system environment of a content management system and a collaborative content management system according to one embodiment.

FIG. 1 shows a system environment including content management system 100, collaborative content management system 130, and client devices 120A, 120B, 120C (collectively or individually "120"). Content management system 100 provides functionality for sharing content items with one or more client devices 120 and synchronizing content items between content management system 100 and one or more client devices 120.

The content stored by content management system 100 can include any type of content items, such as documents, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
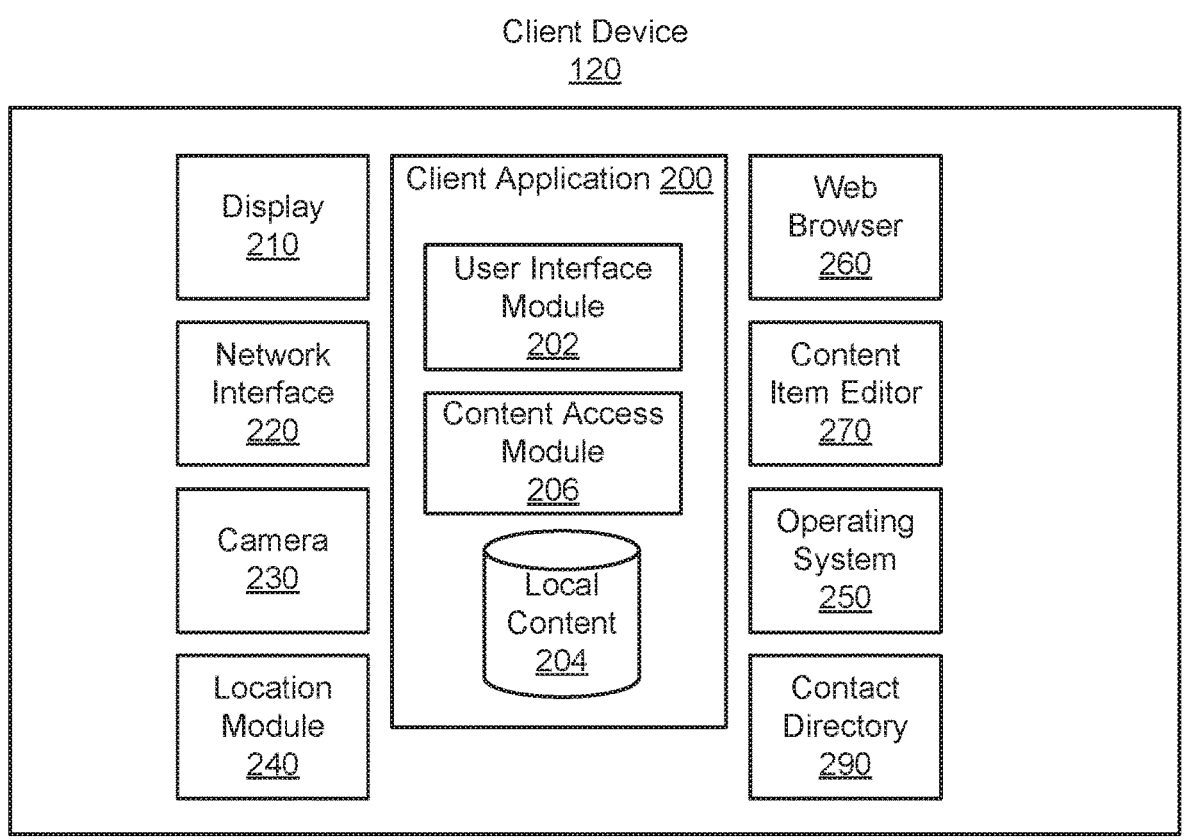
FIG. 2 shows a block diagram of the components of a client device.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
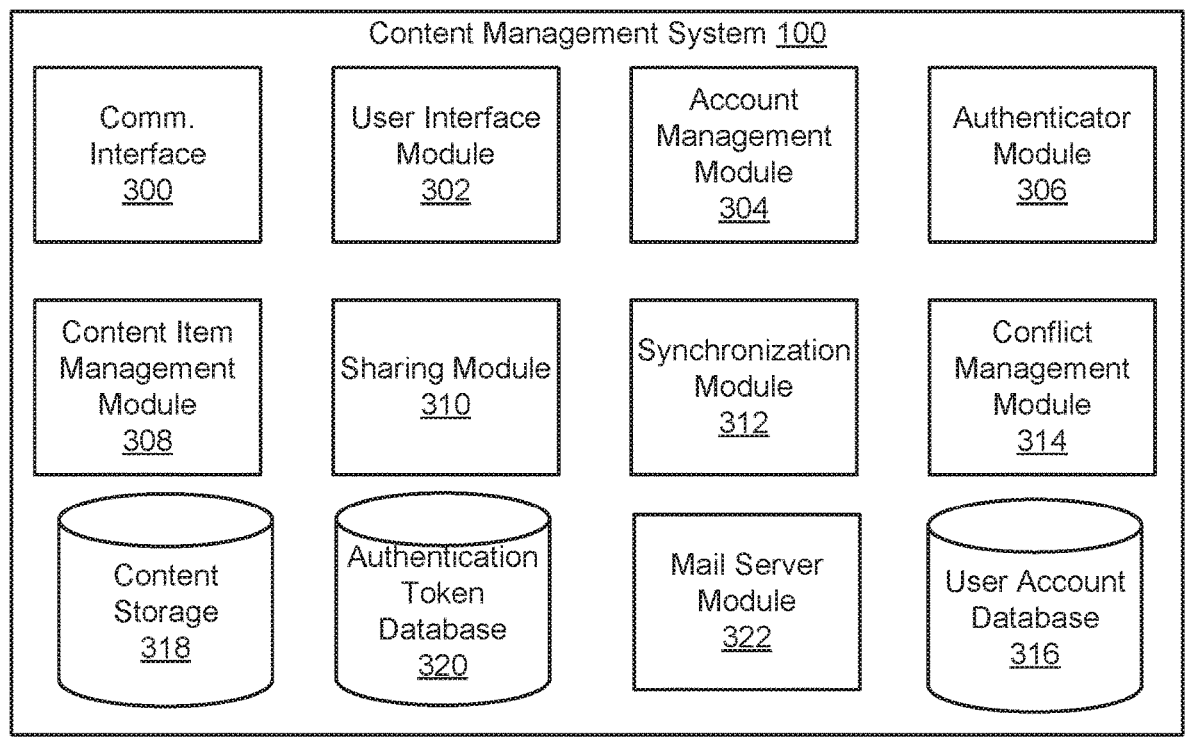
FIG. 3 shows a block diagram of the content management system.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on corresponding identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

Collaborative Content Management System

Figure 4:
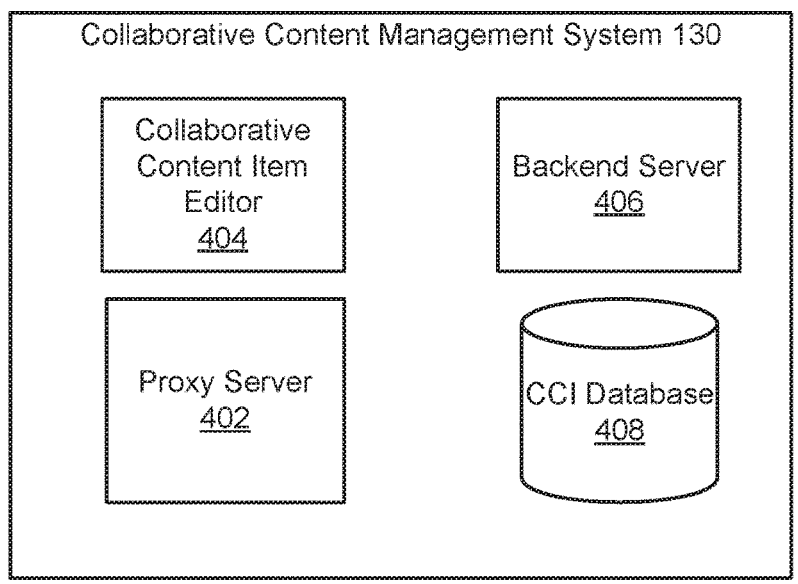
FIG. 4 shows a block diagram of the collaborative content management system.

FIG. 4 shows a block diagram of the collaborative content management system 130, according to one embodiment. Collaborative content items can be files that users can create and edit using a collaborative content items editor 260 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and notification server 410. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Content items database 408 contains a plurality of database objects representing collaborative content items, comment threads, and comments. Notification server 410 detects actions performed on collaborative content items that trigger notifications, creates notifications in notification database 412, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items server 404 to client application 200, so the client application can directly communicate with the collaborative content item editor 404 for future requests. In an alternative embodiment, client application 200 initially communicates directly with a specific collaborative content item 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term does not modify collaborative content items and is processed by backend server 406.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Comment Management User Interface

Figure 5A:
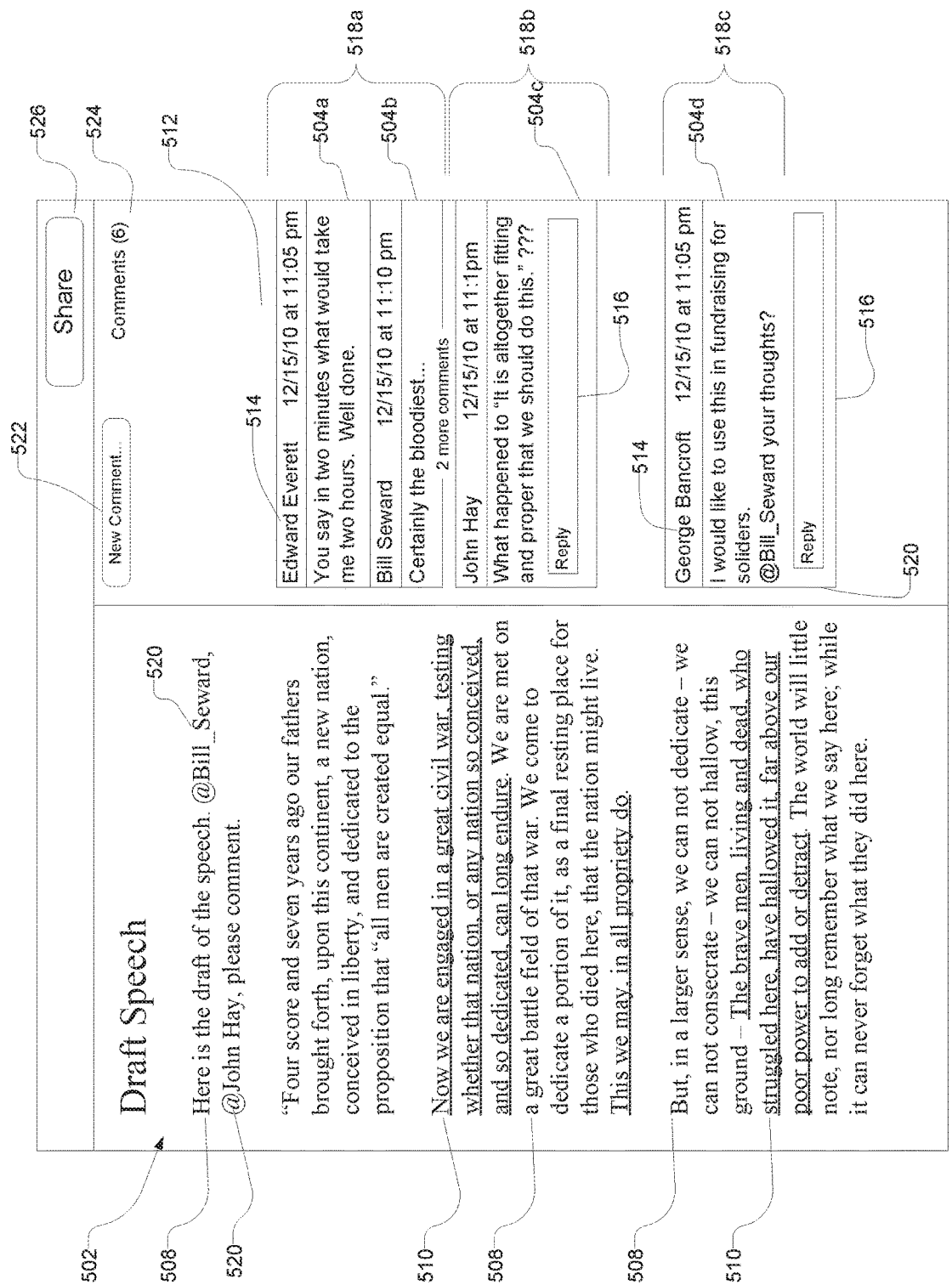
FIG. 5A shows an example user interface with a page of a collaborative content item including various comments.

Referring now to FIG. 5A, there is shown an example user interface with page of a collaborative content item 502 entitled "Draft Speech" in which several comments 504 have been made. In this example, a collaborative content item 502 is composed of content such as lines of text, which can be arranged such as in paragraph blocks 508, and may include any other form of media, such as images, videos, spreadsheets, executable or interpretable code, and so forth.

Content Level Comments

A collaborative content item 502 can have zero or more content level comments 504. Content level comments can be associated with specific portions of a collaborative content item. The presence of content level comments 504 within the content item may be indicated by underlined (or colored underlined) portions 510 of content, though any other formatting may be used to indicate the presence of a content level comment 504 (e.g., lines connecting the content level comments to the content item, comment numbers in superscript form, highlighting, a "hover over" display indicator etc.). The portion 510 of content with which a content level comment is associated is also called a span. Content level comments 504 can be associated with overlapping spans; the first and second content level comments 504a, 504b are applied to the span "Now we are engaged in a great civil war, testing whether that nation, or any nation so conceived, and so dedicated, can long endure" and the third comment 504c is associated with just the span "This we may, in all propriety do."

The content level comments 504 are arranged in a comment pane 512 positioned to the side of the body of the collaborative content item 502. Each content level comment 504 has an author 514 (indicated by user name) and a creation date and time. A collection of comments that together form an exchange between users with respect to a single span is a thread 518. Threads are displayed proximate the span that is associated with the thread. In the example of FIG. 5A, there are three threads, 518a, 518b, and 518c; thread 518a has a total of four comments (two shown, and "2 more comments" as indicated) and the other threads have one comment each.

A user may create a new comment or reply to existing comment. To create a comment, a user selects a span in the content item, and activates a comment function, for example via button 522, menu or other input. The new comment 504 is displayed in the comment pane 512, indicating the user name and creation time, and the user may then enter text for the comment therein. The user can apply text formatting to the text of the comment as done for formatting the text of the collaborative content item. A user may also create a comment to include in a thread by entering text into a reply field 516 in one of the comments 504, such as the most recent comment in a thread 518.

When a user opens a collaborative content item initially, the comment pane 512 can be closed such that the comments therein are hidden. The user can activate the comment pane 512 to show the content level comments by selecting text (e.g., double clicking) text that is formatted or otherwise indicated as having an associated comment. In some implementations, the comment pane 512 can be visible when a collaborative content item is opened. The pane 512 includes a counter 524 of the current number of content level comments in the collaborative content item that are visible to the user. Each comment can have a state, as to whether the comment is active or resolved. The counter 524 serves as a menu that the user can select from to filter the comments so as to show all comments, active comments or resolved comments.

A collaborative content item may also include a share icon 526 that allows a user to share the collaborative content item with other users of the content management system 100. Upon clicking on the share icon 526 a sharing interface is displayed to the user. As discussed below in relation to FIG. 5E, the sharing interface can include a field for adding user names or email addresses to the list of users with which the collaborative content item is to be shared. The sharing interface may also include a text field to allow the sharing user to send a message to users receiving the request to share the collaborative content item.

File-Level Comment Interfaces

The collaborative content management system 130 also enables file-level commenting and may utilize a number of user interfaces depending on the embodiment. A file-level comment is associated with the file itself and persists with the file until the file is deleted or the comment itself is deleted. This allows for conversations between users to occur on a file-level that persists with each iteration on the file. The methods described herein, also allow for the simultaneous display of the collaborative content item and file-level comments so a user can review the collaborative content item and make comments on the collaborative content item without having to change windows. File-level comments have many of the same characteristics as the content level comments and rely on the same underlying data structure, as discussed with regard to FIG. 7. However, file-level comments are not associated with a span of the collaborative content item and are instead associated with the entirely of the content item. Despite this differences, file-level comments may be used to form threads and have an associated author, creation time and date, which may be displayed in a similar fashion as in content level comments depending on the embodiment.

Because file-level comments are not associated with a particular span of the collaborative content item, different UI elements may be used to display the file-level comments. FIGS. 5B-5E illustrate a number of embodiments for creating and displaying file-level comments.

FIG. 5B shows an example user interface with a file-level comment associated with the title of the collaborative content item. FIG. 5B displays the same six comments and four threads as in FIG. 5A, with the addition of a file-level comment 528. The file-level comment is displayed alongside the content level comments in the comment pane 512. Instead of being for a particular span in the collaborative content item, as with the content level comments, the file-level comment 528 is associated with the entire document, and is indicated in the collaborative content item by visually distinguishing features 531, such as formatting or highlighting, borders or the like to the title of the collaborative content item 530. Optionally, the same visually distinguishing features can be applied to the comment itself, so that the user knows that which comments are associated with the file and which with specific spans of the content item. FIG. 5B also illustrates the use of a file-level primitive 532, "@file", to indicate that a comment is file-level comment rather than a content level comment. File-level primitives are further discussed below.

FIG. 5C shows an alternate embodiment for displaying file-level comments in a visually distinguished manner from content level comments. In this embodiment, instead of displaying the file-level comments with visually distinctive formatting and the content level comments in the same pane, the client application 200 displays each type of comment in separate tabs of the comment pane including the content level tab 534 and the file-level tab 536. In FIG. 5C the content level tab 534 is active, and so content level comments of the collaborative content item are displayed. The user may click on the tab and the client application 200 will then display the comments corresponding to tab that received the click interaction. If separate panes are used to display each type of comment it may not be necessary to display any association between a file-level comment and the title of the collaborative content item as shown in FIG. 5B.

FIG. 5D shows an example of the user interface including separate content level and file-level tabs with the file-level tab displayed, here with the file-level tab is active, e.g. resulting from a user interacting with the file-level comment tab 536. The comment count 538 can update based on the number of comments being displayed in each tab or based on a total number of comments in both tabs. A file-level comment may be created by a user using the new comment button when the file-level tab is active. Alternatively, both the content level pane and the file-level pane can be shown concurrently, in separate panes (e.g., the file-level pane displayed above the content pane).

FIG. 5E shows an example user interface illustrating a sharing interface 540 that can cause a sharing message to be added as a collaborative content item comment, such as a file-level comment. Sharing interface 540 may be a pop up interface, a separate page, or may be displayed as a pane in the same window as the collaborative content item. The sharing interface 540 includes a privileges menu 542, a send-to field 544, a message field 546, a comment checkbox 548, and a send button 550. The share interface allows the user to share the collaborative content item, such as with indicated email addresses or with other users of the content management system 100. When a collaborative content item is shared, the content management system 100 can send an email to each of the users specified in the send-to field 544. In some implementations, this email can include a URL link to the shared document. The URL link may be accompanied by a message provided by the sharing user in the message field 546. The sharing user may also assign viewing, editing, commenting, or other privileges to users that receive the sharing invitation by selecting an option from the privileges menu 542. Privileges menu 542 may be a drop down menu or any other such UI feature. In some embodiments, a user may use the comment checkbox 548 to indicate that content in the message field 546 should be used as the content of a file-level comment, e.g. added as a file-level comment. The process for creating a thread in this way is detailed with reference to FIG. 13 below.

User Interface for Displaying a List of Notifications

FIG. 6 shows an example user interface with a list of collaborative content items 602 and a list of notifications 604. This user interface allows a viewing user to view the collaborative content items to which the viewing user has been granted access (hereinafter "the user's collaborative content items"). As referred to herein, the "viewing user" is the user viewing the user interfaces described herein. In this example, the collaborative content management system 130 has granted the viewing user access to multiple collaborative content items, including the five collaborative content items 606A through 606F shown in the "recent docs" tab 608 of the user interface. The user interface also includes "created by me" and "shared with me" tabs 610, 612 that the viewing user can select to access additional lists of collaborative content items.

When other users make certain types of changes to the viewing user's collaborative content items, the collaborative content management system 130 generates a notification of the change. The collaborative content management system 130 defines one or more triggering actions. A triggering action is a change made by another user that causes the collaborative content management system 130 to create a notification about the change and provide the notification to the client device of the viewing user. For example, a triggering action may occur when another user adds or alters a portion of the collaborative content item, or adds a comment to a thread, for example in a thread that already includes a comment added by the viewing user.

The client application 200 receives notifications from the collaborative content management system 130 and can display a notification in a variety of ways. One way of displaying a notification is the notification list 604 shown in FIG. 6. The notification list 604 includes notifications for several of the viewing user's collaborative content items, and it is displayed when the viewing user selects the notification icon 614. In the example shown in FIG. 6, the notifications in the notification list 604 are sorted by the age of collaborative content item, and the notifications for each collaborative content item are sorted from most recent to least recent.

The client application 200 displays each notification in the notification list 604 with notification text and a short phrase indicating whether the notification relates to a comment or a portion of text in the collaborative content item content. Although not explicitly shown in FIG. 6, each notification can also include a content span and a notification link. The content span associates the notification with a span of content in a collaborative content item 502. The notification link is a link to the collaborative content item and includes a pointer to the content span. A user input selecting a notification in the notification list 604 selects the link. The selection of the link causes the client application 200 to open the collaborative content item to a position where the content span is visible. As a beneficial result and improvement in functionality, the user does not have to scroll through the collaborative content item to find the change that was the subject of the notification.

Referring to the final notification 616 in the notification list 604 as an example, the notification text is the user primitive "@Bill Seward" and the adjacent text "your thoughts." A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user. In one embodiment, the user primitive takes the form of @username where the "@" symbol is a predetermined token that indicates to the collaborative content management system 130 that the following string "username" is the user name of a system user. In some implementations, other predetermined tokens can be used to indicate a primitive. If the user selects this notification 616, the notification link causes the client application 200 to open the collaborative content item 502 shown in FIG. 5 to a position where the span 510b is visible.

If the notification is generated in response to a file-level comment, the file-level comment may have no associated span in the associated collaborative content item or may set the span to be the collaborative content item title. The link included in the notification may open the collaborative content item displaying the beginning of the content or the title.

In addition to displaying notifications for file-level comments in notification list 604, the client application 200 may also display a file-level thread pane 618, which displays file-level comment threads corresponding to a selected collaborative content item 620. In some implementations, file-level thread pane 618 can display file-level comment threads corresponding to multiple selected collaborative content items. In some implementations, file-level thread pane 618 can display file-level comment threads corresponding to multiple of collaborative content items 606, whether or not the collaborative content items are selected. In the illustrated example, file-level comments from the collaborative content item titled "Draft Speech" are displayed in the file-level thread pane 618. In some embodiments, users may utilize the file-level thread pane 618 to add or reply to file-level comments without opening the associated collaborative content item.

In various implementations, any of collaborative content items, the associated comments, or collaborative content item file structure and other metadata can be locally stored on a client device. For example, content can be downloaded from the collaborative content management system 130 for use in an offline mode. The inclusion of a file-level thread pane 618 may be especially beneficial for this offline use where file-level comments may be downloaded for offline viewing in the file-level thread pane 618. This would allow users to receive some information about collaborative content items without having to store the enter contents of the collaborative content items locally. For example, can users may view file-level comments for collaborative content items listed in file-level thread pane 618, without requiring the collaborative content items to also be locally stored.

Database Structures

Figure 7:
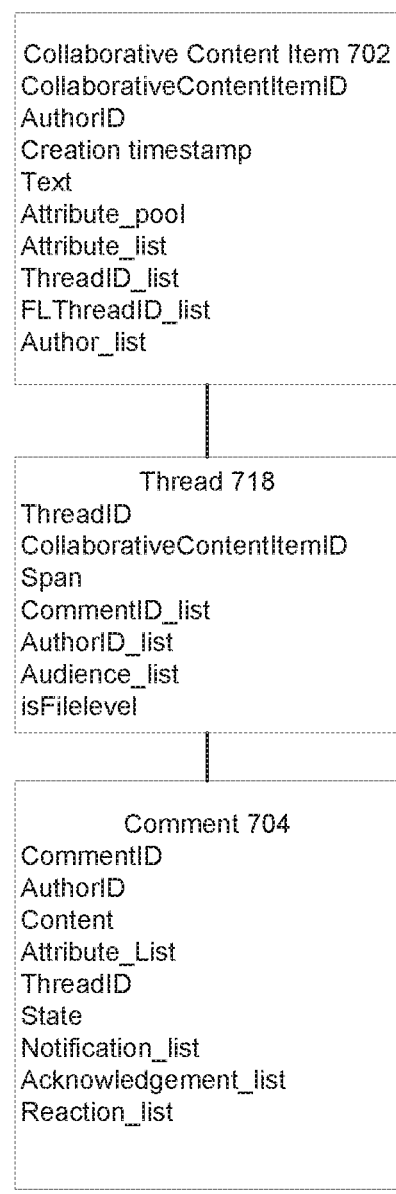
FIG. 7 shows an embodiment of the data structures for collaborative content items, comments, and comment threads.

Referring to FIG. 7, collaborative content item database 408 (CCI database) stores the collaborative content items, content level and file-level comments, and threads as database entities, and provides programmatic access thereto for searching and retrieving these entities and is one means for performing these functions. The CCI database 408 can be implemented in a relational form using separate tables for collaborative content items, threads, and comments, or using objects, BLOBs, files, or other structures. Additionally, the CCI database 408 may provide a folder hierarchy storage system separate from the content management system 100. In this case, folders would be saved as an additional data structure in the CCI database 408.

Each collaborative content item data element 702 is composed of a number of elements. In one embodiment the elements are as follows:

CollaborativeContentItemID: a unique identifier assigned by the collaborative content management system 130 to access the collaborative content item.

AuthorID: the userID of the user who created the collaborative content item, and may include the username of the user. These values may be encrypted for privacy.

Creation timestamp: indicates the date and time that the collaborative content item was created.

Text: The text of the collaborative content item is represented as string of ASCII characters.

Attribute_pool: Formatting attributes (e.g., bold, underline, italics, font, font size, line spacing, paragraphs, and the like) that are used in the collaborative content item. The attribute pool is a set of attributeIDs used in the collaborative content item; a native set of attributeIDs and associated formats are provided by the collaborative content management system 130. The following table is an example of a portion of an attribute pool:

| Attribute ID | Formatting |
| --- | --- |
| 0 | None |
| 1 | Bold |
| 2 | Italic |
| 3 | Underline |
| 4 | Strikethrough |
| 5 | Superscript |
| 6 | Subscript |
| 7 | Single space |
| 8 | Double space |
| ... | ... |

Attribute_list: Formatting attributes are applied to portions of a content item, such as text, by the attribute list. The attribute list element is a list of (span=attributeID) pairs, where the attributeID indicates the attribute(s) from the attribute pool and the span specifies the number of characters to which the attribute(s) is to be applied when the text is rendered, starting from the end of the previous span, so that the entire length of the collaborative content item is coded for attributes. For example, the text "Text with bold, italic, and bold italic formatting." would be attribute coded as {10=0, 4=1, 2=0, 6=2, 5=0, 11=1 2, 12=0}.

ThreadID_list: a list of all threads that are associated with a collaborative content item. ThreadIDs in the ThreadID_list may represent threads of content level comments or threads of file-level comments.

FLThreadID_list: a list of all file-level threads 528 that are associated with a collaborative content item. Thus, the FLThread_list contains a subset of the threads in Thread ID list.

Author_list: a sequential list of the users who have contributed to the collaborative content item text, according to the sequence of contributed or edited text portions, using the same coding pattern as attribute list, i.e., (span=userID) pairs. For example, the author_list {100=199, 50=54, 200=199} indicates that in a text of 350 characters, there is a sequence of three text portions, the user with userID 199 authored the first portion with 100 characters, followed by userID 54 who authored the second portion with 50 characters, followed again by userID 199 who authored the third portion with the remaining 200 characters.

The span coding of the attributes and authors is beneficial because it allows for efficient management of insertions and deletions of content. For example, when text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example, with the userID of each author followed by a list of text portions edited by that user.

Each thread data element 718 is composed of a number of elements. In one embodiment thread data element 718 includes the following elements:

ThreadID: unique identifier assigned by the collaborative content management system.

CollaborativeContentItemID: the CollaborativeContentItemID of the file that contains the thread.

Span: a delineated portion of the content of the identified collaborative content item to which the thread applies. The delineated portion is defined based on the type of the content. For example, a span in text can be defined by the position of the first character in the span, and the length of the span (in number of characters); a span in an image can be defined by a bounding region, for example a set of (X,Y) coordinates, relative to the image origin that define a polygon within the region; a span in a spreadsheet can be defined by a range of cells by column and row numbers. For example, the span (50, 25) indicates a text portion starting at character position 50 within the collaborative content item and running 25 characters in length. As the content in the collaborative content item is edited, the collaborative content management system 130 updates the span element of each thread. For example, if a five-character portion of the text before the span (50, 25) is deleted, then the content management system will modify the span of the thread to (45, 25). It is also possible for users to delete text included in the span. If all of the text included in the span of a thread is deleted, then the span will have a null value and is removed by the collaborative content management system 130 (unless isFilelevel is True as described below).

In some implementations, only content level comments are associated with a span, in this case a thread of file-level comments may have a null value for a span accompanied by a True value for the isFilelevel element. This is one mechanism for a thread of comments to persist in the CCI database 408 until the thread of comments is deleted, no matter what other content in the collaborative content item is removed or edited. For example, the title of a collaborative content item can be modified (e.g. edited or deleted). This change may not affect the file-level comment, even though file-level comment can be displayed as being associated with the collaborative content item title. For example, if a collaborative content item title is deleted, a file-level comment can remain attached to a field or other designated title location within the collaborative content item. As another example, a user can edit a collaborative content item title. A file-level comment can remain attached to a designated title location within the collaborative content item that contains the edited collaborative content item title.

CommentID_list: a list element of commentIDs of the comment data elements (e.g. comment data elements 704) included in the thread corresponding to thread data element 718.

AuthorID_list: a list of userIDs of the authors of comments in the thread.

Audience_list. The Audience_list element is a list indicating the users to whom the thread and its comments are displayed when accessing the collaborative content item, and to whom notifications of changes in the thread are sent. The audience for a thread can be determined differently for file-level comments than for content level comments. In various implementations, the audience of a content level thread may comprise one or more of the userIDs of the i) the author of the collaborative content item containing the thread; ii) the authors of comments included in the thread; iii) the authors of any text included in the span for the thread; iv) any user mentioned in the span the thread via a user primitive (further described below); v) any user mentioned in a comment via user primitive; or vi) any user who has opened the collaborative content item; vii) any user who has edited the collaborative content item; or viii) any user who has created an association with the collaborative content item, such as by marking it as a favorite or followed collaborative content item. In some implementations, an audience for the thread may not be defined specifically for the thread, but instead may be identified dynamically as needed based on, e.g. user identifiers associated with the comments or with the collaborative content item. The inclusion of an audience for each thread allows for control of which users are notified of, and have access to specific comments as further described below.

isFilelevel: a value indicating whether the thread is a file-level thread (associated with the collaborative content item as a whole as opposed to a particular span) or whether the thread is a content level thread (associated with a particular span in the collaborative content item). Before deleting a content level thread for having a null span, the collaborative content management system 130 checks the isFilelevel value for the thread to determine whether it should be deleted. If isFilelevel is True, the thread will not be deleted. The isFilelevel element is also used to determine how a thread is displayed. If isFilelevel is True the thread is displayed in the collaborative content item as a file-level thread with no associated span. If isFilelevel is False then the thread is displayed as a content level thread and the associated span is highlighted in the collaborative content item.

Each comment data element 704 is composed of a number of elements. In one embodiment, comment data element 704 includes the following elements:

CommentID: a unique identifier assigned by the collaborative content management system 130.

AuthorID: the userID of the author of the comment.

Content: an element storing the content of the comment, which may include text, pictures, or other media.

Attribute_list: a list storing the formatting attributes for the text of the comment, in the same manner as described above for collaborative content items.

ThreadID: the threadID of the thread to which the comment belongs.

State: an enumerated variable storing a value indicating the state of the comment as either active or resolved.

Notification_list: the Notification_list element is a list of userIDs indicating the users to whom a notification of the comment has been sent, as further explained below. This list is updated each time a notification message including the comment is sent to specific user.

Acknowledgement_list: the Acknowledgement_list element is a list of userIDs indicating the status of each user with respect to the comment. For example, the Acknowledgement_list may indicate whether each user in the Audience_list of the thread has yet viewed the comment, has read the comment, acknowledges an instruction in the comment, or intends to respond later to the comment, or any other set of enumerated actions or status types. In various implementations, this list can be updated whenever the collaborative content editor 404 displays the comment to a user that has not yet seen the new comment or when a user selects a control in relation to a comment indicating the user's acknowledgement of the comment or the user's intention to respond to the comment. In some embodiments, the collaborative content editor 404 may display a visual indication of users that have viewed a particular comment proximate to the comment in the display. Additionally, the collaborative content management system 130 may provide UI elements for indicating status beyond applying a "read receipt" when a user views a comment for a first time.

Reaction_list: reactions are elements that represent reactions of each user in the audience of the thread to the comment. The reaction list comprises a list of reaction values paired with userIDs. In some embodiments, an interface for providing reactions to each comment is provided and a user may select a reaction using a pull down feature or another such UI feature. An enumerated set of reactions is natively provided (e.g., "Approve," "Disapprove", "Happy", "Angry", "Puzzled" with associated numeric codes 1 . . . 5). Upon selection of a reaction from a reaction interface the numeric code corresponding to the selected reaction is added to the reaction list. For example, reaction pair (345, 5) would indicate that the user with userID 345 had an angry reaction to the comment. In some embodiments, the collaborative content editor 404 displays a visual indication of each reaction proximate to the comment in the display.

CCI database 408 may also include a set of indices. These indices are logical in nature and may be implemented in various ways, depending on the underlying database design. A user index contains a list of all users by their userID, and for each userID there is a list of collaborativeContentItemIDs. Each collaborativeContentItemID identifies a collaborative content item to which the user of the userID is associated and has access to. For each collaborativeContentItemID, there is a status indicator that indicates whether the collaborative content item is active or inactive for the user. A collaborative content item is active for the user sharing the collaborative content item until the user deletes the collaborative content item. In one embodiment, when the user deletes the collaborative content item, the collaborative content item persists in the collaborative content item database 408 remains associated with the user but status indicator is set to inactive, allowing the user to reactivate their sharing status with the collaborative content item in the future. The collaborative content item remains active for and associated with any other shared users. Alternatively, the collaborative content item may be deleted from the item database 408, so that none of the shared users have access to it anymore. The user index is used to identify collaborative content items associated with (shared with) a given user and the status of those collaborative content items with respect to the user. In some embodiments, a userID index also indicates the privileges the user has with respect to each document that the user is associated with. A value stored with each collaborativeContentItemID in the index indicates whether the user has editing privileges, viewing privileges, and/or sharing privileges.

Collaborative content item database 408 can include a collaborative content item index. The collaborative content item index indicates, for each document, a list of userIDs of users having access to the collaborative content item, and an indication of whether the user is active or inactive. This index can be an inverse of the user index and may be stored together with the user index. The collaborative content item index may also indicate the privileges of each user associated with the collaborative content item using an inverse implementation of the above described user index.

Creating File-Level and Content Level Comments

Figure 8:
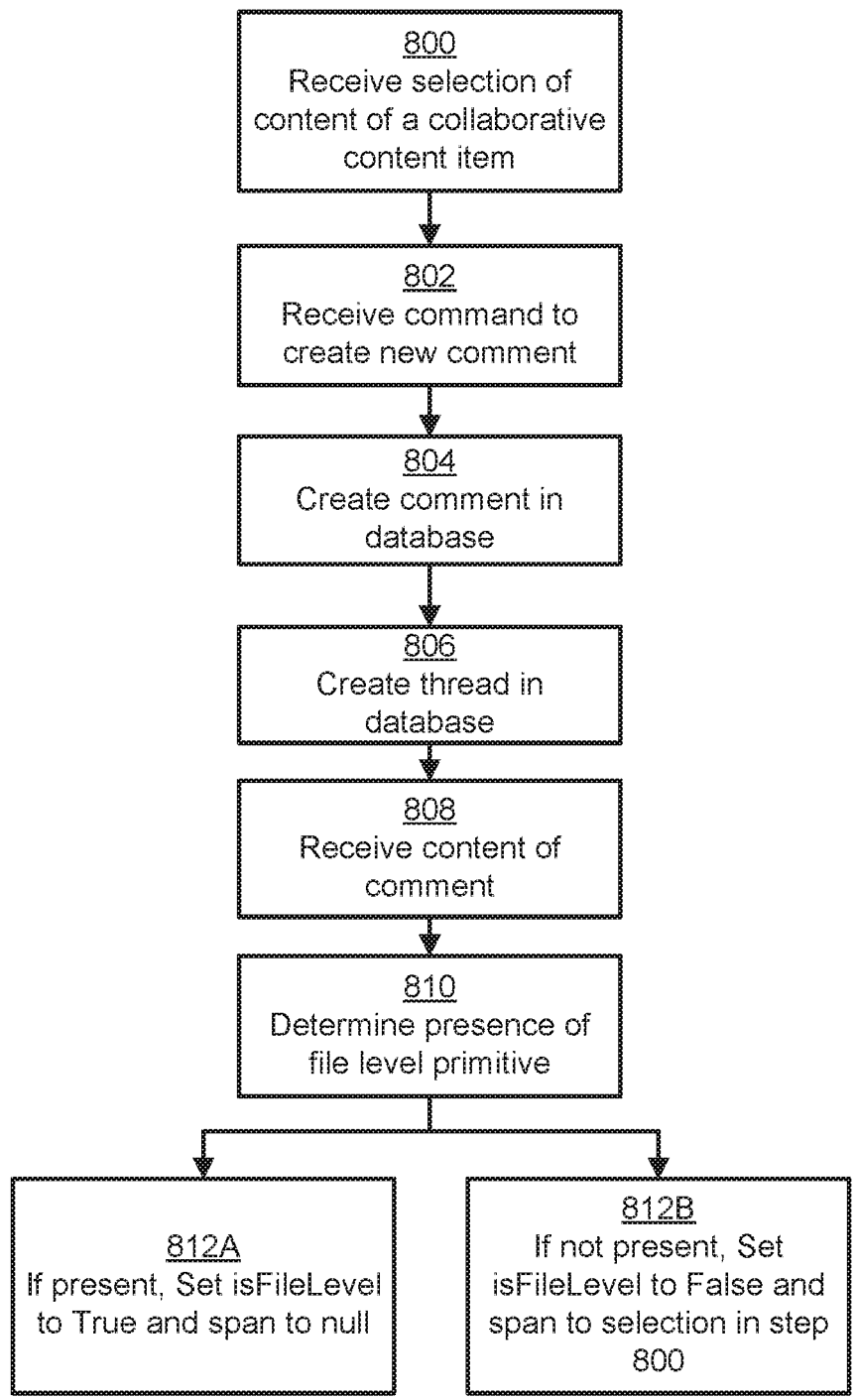
FIG. 8 shows one embodiment of an algorithm of generating a new content level comment thread.
Figure 9:
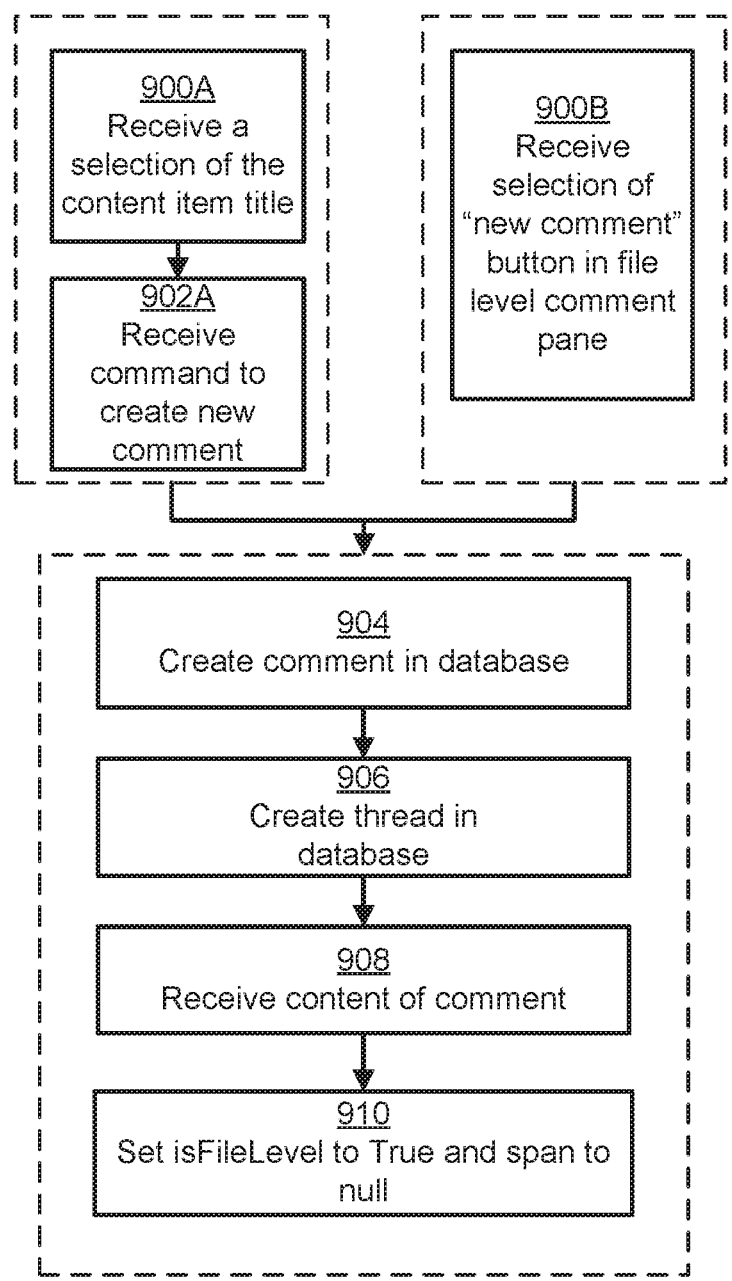
FIG. 9 shows embodiments of algorithms for creating a file-level comment thread.

The level of a comment (e.g., file-level or content-level) can be indicated in various ways. In some implementations, a comment level can be determined based on the content of the comment, such as any included file-level primitives (as shown in FIG. 8). In some implementations, a comment level can be based on the combination of UI and/or collaborative content item features selected to create the comment (as shown in FIG. 9). In some implementations, a comment level can be based on whether the comment was created through a sharing interface (as shown in FIG. 11).

FIG. 8 shows an embodiment of an algorithm for creating a comment as a file-level comment or a content-level comment based on whether the comment content includes a file-level primitive. First the collaborative content management system 130 receives 800 a selection of content of a collaborative content item. The selection may include any type of content that may be included in a collaborative content item such as, text, images, videos, or any other media. After receiving the selection of content, the collaborative content management system 130 receives 802 a command to create a comment associated with the selection of content. In some embodiments, the command may specifically indicate that the comment should be designated as a content level comment. For example, the command could be entered using the "new comment" button in content-level comment tab 534. In some embodiments, the command may specifically indicate that the comment should be designated as a file-level comment, as discussed below in relation to FIG. 9 and FIG. 11.

The collaborative content management system 130 creates 804 a comment in the CCI database 408 and assigns a commentID, and the userID of the user to the authorID of the comment. The collaborative content management system 130 creates 806 a thread object (e.g. thread 718) in the CCI database 408, assigning a new threadID, and adding the commentID for the comment to the commentID list for the thread. In various implementations, a thread entry can be created when an initial comment is created or when a reply comment to the initial comment is entered. In the latter case, values described above as being stored for a thread (e.g., values thread data element 718) can instead be stored for a comment (e.g., in the comment data element 704). Furthermore, while descriptions are provided for performing operations with respect to a comment, in some implementations, these operations can instead be performed with respect to a comment thread.

The collaborative content management system 130 displays an interface for receiving a content input and receives 808 the content of the comment (including any text, text formatting, images or the like) input by the user.

After receiving 808 the content of the comment, the collaborative content management system 130 may determine 810 the presence of a file-level primitive. A file-level primitive is indicated by a signaling character sequence (e.g., "@"), which may be followed by a particular text string (e.g., @file). An example file-level primitive 532 is illustrated in FIG. 5B. The file-level primitive signals to the collaborative content management system 130 that the comment should be designated as being associated with the file as a whole as opposed to a particular span in the collaborative content item. This functionality is especially useful for embodiments where there is only a single UI element for creating a generic comment (as opposed to separate buttons for creating either a file-level comment or a content level comment). The collaborative content management system 130 scans the selection 800 of content from the collaborative content item and/or the received 808 comment content for the file-level primitive. Upon detecting the presence of the file-level primitive in the text of a comment, the collaborative content management system 130 sets 812A the span of the comment to null and sets the isFilelevel element of the comment to true, designating the comment as a file-level comment. If no file-level primitive is present in either the selection 800 of content or the received 808 content of the comment then the collaborative content management system 130 sets 812B the isFileLevel element of the comment to False and the span of the thread to the selection 800 of content from the collaborative content item, thereby designating the comment as at a content level.

Upon creation of a content level comment, the collaborative content management system 130 proceeds to determining the audience of the content level comment in accordance with the algorithm described in FIG. 12. If instead a file-level thread is created, the collaborative content management system proceeds to determining the audience of the file-level comment in accordance with the algorithm described in FIG. 13.

FIG. 9 shows two different embodiments ("A" and "B") of algorithms for creating a file-level comment thread. First, the collaborative content management system 130 receives information to create a new file-level comment. In embodiment A, the collaborative content management system 130 receives 900A a selection of at least a portion of the collaborative content item title and subsequently receives 902A a command to create a new comment; the user may instead select a first header, first heading, or other portion of the content item that is designated as being used to indicate a file-level comment. In some implementations, the comment is only designated as a file-level comment if the entire collaborative content item title is selected. In some implementations, the comment is only designated as a file-level comment if the selection includes at least a portion the collaborative content item title, but no subsequent part of the collaborative content item. In embodiment B, the collaborative content management system 130 may receive 900B a selection of a "new comment" button when file-level tab 536 is selected (as shown in FIG. 5D).

However the information is received, the collaborative content management system 130 creates 904 a comment in the CCI database 408 and assigns a commentID, and the userID of the user to the authorID of the comment. The collaborative content management system 130 creates 906 a thread object in the CCI database 408, assigning a new threadID, and adding the commentID for the comment to the commentID list for the thread. As with step 806, in various implementations, a thread entry may be created when an initial comment is created or when a reply comment to the initial comment is entered.

The collaborative content management system 130 displays an interface for receiving a content input and receives 908 the content of the comment (including any text, text formatting, images or the like) input by the user.

In accordance with steps 900A and 902A and 900B, the newly created commentID and threadID have been designated by the user as a file-level comment. Subsequently, the collaborative content management system 130 sets 910 the isFilelevel element for the comment to True and the span of the thread to null. Alternatively, the span of the thread can be set to the collaborative content item title. The collaborative content management system 130 then proceeds to determining the audience of the file-level thread as described with reference to FIG. 13.

Figure 10:
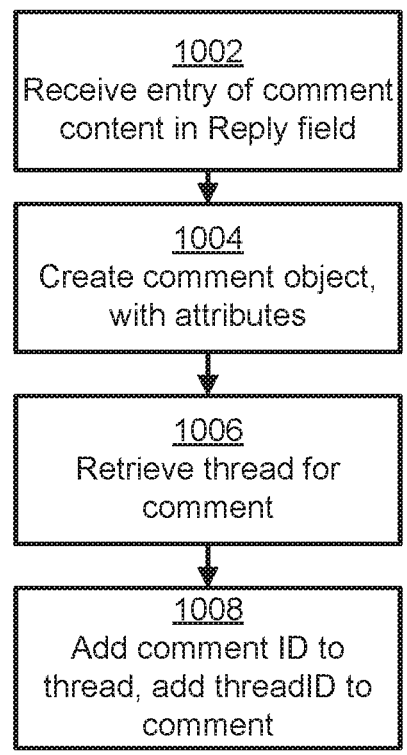
FIG. 10 shows one embodiment of an algorithm for replying to a comment using a reply field.

As noted, a comment can be created by replying to an existing comment. FIG. 10 shows one embodiment of a method of creating a comment as a reply to an existing comment, as may be performed by the collaborative content management system 130 in coordination with a collaborative content editor 404. The collaborative content management system 130 receives 1002 the entry of a comment content in the reply field of an existing comment. The collaborative content management system 130 creates 1004 a new comment in the CCI database 408, along with the attributes for the authorID of the user who replied, the content of the comment and formatting attributes. In some implementations, the new comment will be in the context of an existing thread and the collaborative content management system 130 retrieves 1006 the thread information. In some implementations, the existing comment may not already be associated with a thread. In this case, the collaborative content management system 130 creates a new thread and associates the existing comment with the new thread. The commentID of the reply comment is added 1008 to the list of commentIDs stored in the thread, the authorID is added to the authorID_list for the thread, and the threadID is added to the comment.

Figure 11A:
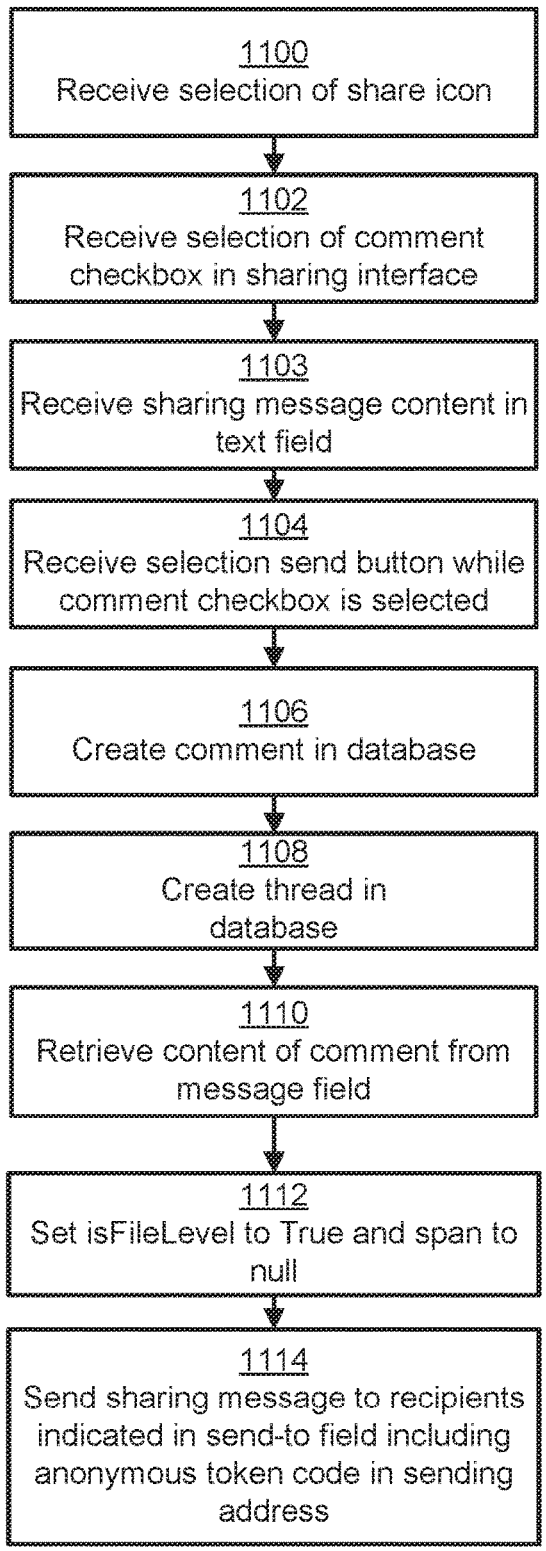
FIG. 11A shows one embodiment of an algorithm for creating a file-level comment using a sharing interface.

FIG. 11A shows one embodiment of an algorithm for creating a file-level comment using a sharing interface. Collaborative content management system 130 may receive 1100 a selection of the share icon 526 indicating that the user would like to share the collaborative content item with other users, or potential users, of the collaborative content management system 130. Upon receiving the selection 1100, the collaborative content management system 130 opens sharing interface 540. The collaborative content management system 130 then receives 1102 a selection of a comment checkbox 548 in the sharing interface 540 by the user and receives 1103 sharing message content in the field 546 of sharing interface 540. The sharing message content can be any content that the user wishes to send in a sharing message to other users along with a link to access the collaborative content item.

After the user has entered their desired sharing message content the user may select the send button 550 of the sharing interface 540. Upon selection of the send button 550, the collaborative content management system 130 determines that the comment checkbox has been selected and creates 1106 a comment in the CCI database 408, which can also be associated 1108 with a new thread in the CCI database 408. The collaborative content management system 130 retrieves 1110 the comment content for the newly created comment from the previously received 1103 sharing message content at the field 546.

Because the comment thread is was created through the sharing interface, the collaborative content management system 130 automatically designates the thread as being a file-level thread by setting 1112 the isFileLevel element for the thread to True and may also set the span of the comment to null or to the collaborative content item title.

Finally, the collaborative content management system 130 sends 1114 sharing messages to recipients designated in the send-to field 544 of the sharing interface 540 using mail server 322. An anonymized token code can be included in a field of the sharing message indicating a sender of the message. For example, in an email sharing message, the anonymized token code may be included in the sent-from email field. In addition, the address that includes the anonymized token code may specify a server different from the actual sending server in the sent-from field of an email message. In some embodiments, the token code is a hashed value of the collaborativeContentItemID and threadID for which the sharing message is being sent. The sharing message also includes the content entered into the field 546 of the sharing interface 540 along with addressing information of a network path to the collaborative content item (e.g., a URL to the collaborative content management system 130). A recipient of the sharing message can select the network path to access the collaborative content item. This access can be provided according to the selection received by the sharing user in privileges menu 542 of the sharing interface. If the user edits the collaborative content item, the collaborative content management system 130 adds the userID of the user to the Author_list of the collaborative content item and updates the CCI database 408 to reflect that the user has edited the collaborative content item.

Figure 11B:
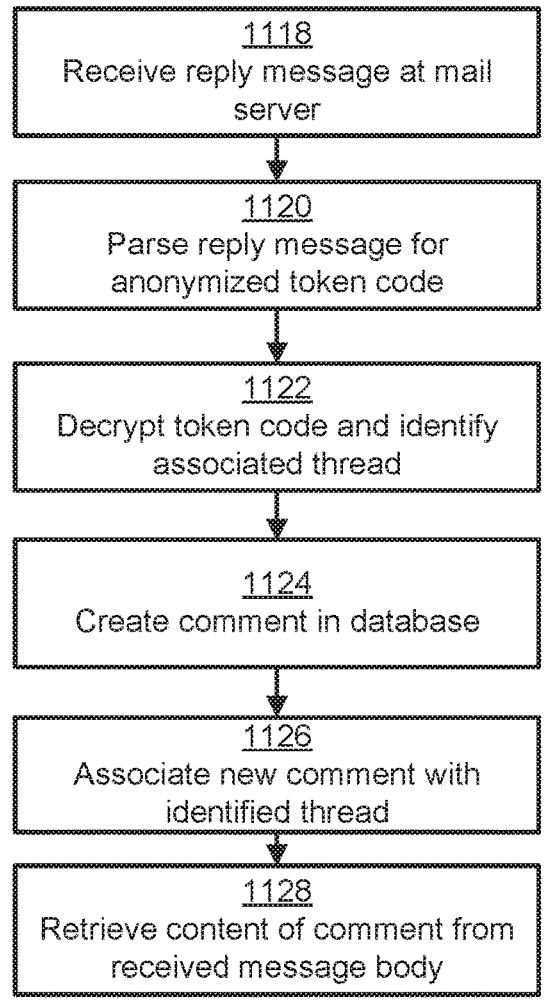
FIG. 11B shows one embodiment of an algorithm for replying to a file-level thread by replying to a sharing message.

FIG. 11B shows one embodiment of an algorithm for replying to a file-level thread by replying to a sharing message. In some embodiments, a user may add a comment to a file-level thread by replying via email to a sharing message. This allows for a conversation pertaining to the collaborative content item to occur over email or other messaging systems in addition to the native commenting system provided by the collaborative content management system 130.

The algorithm is initiated when a reply to a sharing message is received 1118 at the mail server 322. The mail server 322 then parses 1120 the address that the reply was sent to for the anonymized token code. The mail server 322 then decrypts 1122 the anonymized token code to determine the CollaborativeContentItemID and threadID associated with the anonymized token code.

Upon successfully decrypting 1122 the anonymized token code included in the reply message, the collaborative content management system 130 creates 1124 a new comment object in CCI database 408. The comment is then associated 1126 with the thread identified in the anonymized token code. The content of the comment is then retrieved 1128 from the body of the received email message. Associating the comment with the thread results in the comment being included in designated file-level thread when the document is displayed.

In some embodiments, after adding the content of the received message as a file-level comment, the mail server may also forward the received message to email addresses associated with the other users in the file-level thread (e.g. users who have added a comment in the thread or are mentioned in the thread). In some embodiments, this may be accomplished by sending a notification to each user in the thread. For example, the notification can indicate that a new file-level comment has been added to the thread, and include a link to the collaborative content item containing the file-level comment and/or the content of the new file-level comment.

User Primitives

In some embodiments, the collaborative content management system 130 is configured to recognize particular text patterns as functional primitives that activate various functions of the collaborative content management system 130. One type of functional primitive is a user primitive. A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user.

In one embodiment, the user primitive takes the form of @username where the "@" symbols is a predetermined token indicates to the collaborative content management system 130 that the following string username is the user name of a system user. Referring to FIG. 5A, several examples of user primitives 520 are illustrated. First in the text of the collaborative content item, the first sentence includes the user primitives "@Bill_Seward" and "@John_Hay. The user primitive "@Bill_Seward" is also shown in the text of comment 504c. The collaborative content management system 130 recognizes these primitives as it processes the text of the collaborative content item and comments.

When a user primitive indicating a specific user appears in the span for a thread, or the text of a comment, the collaborative content management system 130 includes the userID for the indicated user in the audience for thread containing the comment. In some implementations, this can allow the mentioned user to see the entire thread in which they are mentioned when accessing the collaborative content item (since, in some implementations, access to the thread when opening a collaborative content item is determined by presence of a user's ID in the audience), as well for a mechanism to notify the user, as next described.

In one embodiment, when a user primitive occurs elsewhere in the collaborative content item, but outside of the span for the thread, the userID for the mentioned user is included in the audience. For example, if a user is mentioned in the same paragraph as the span for a thread, the userID for the user is included in the audience.

Contextual Primitives

In addition to user primitives, the collaborative content management system 130 may also support contextual primitives. Contextual primitives function in a similar way to user primitives, however, instead of adding a single user to the audience of a thread, contextual primitives add a group of users to the audience of a thread using document context. A contextual primitive is indicated by a predetermined token followed by a predetermined text string. Each predefined text string may incur different functionality from the collaborative content management system 130. A user inserts the contextual primitive as they are editing the content item.

In some implementations, including the @doc primitive can cause every user with access to the collaborative content item to be included in the audience of a thread that includes the primitive. An algorithm to achieve this functionality is as follows. The collaborative content management system 130 detects the "@doc" text string in the span of a thread or in a comment content and accesses the collaborative content item index of the collaborative content item database 408. The collaborative content management system 130 determines the userIDs with viewing privileges for the collaborative content item according to the collaborative content item index and adds those userIDs to the audience_list for the thread. Alternatively, as discussed below, the system can include an entry in the collaborative content item audience list indicating that multiple users such as all users, authenticated users, users that are part of a particular group, etc., should be included as audience members. When the collaborative content item is subsequently accessed, the thread including the "@doc" primitive will be visible to all users viewing the collaborative content item. Additionally, any notification generating activity in the thread will be reported to all users in the collaborative content item or to all users that have viewed the collaborative content item.

In some implementations, the "@doc" primitive can specify a group of users that have interacted with the collaborative content item, such as the users that have selected an option to follow the collaborative content item, users that have edited the collaborative content item, or any combination thereof.

In some embodiments, the "@doc" primitive is dynamic such that any users that are added to the collaborative content item even after the thread has been created will be able to view the comment thread. This may be accomplished by reevaluating the span of a thread and the comment text of a thread each time the collaborative content item is compiled. Alternatively, instead of adding userIDs to the audience_list of a thread directly, the collaborative content management system 130 may create a special ID value indicating that the "@doc" primitive has been used. Therefore, during compilation of the collaborative content item, the collaborative content management system 130 checks to see if a particular thread should be displayed to a viewing user by referencing the audience_list of the thread. If the collaborative content management system 130 detects the special ID associated with the "@doc" primitive it will reference the collaborative content item database 408 to determine which users have viewing permissions. If the user ID of the current user is included in the collaborative content item database 408 then the collaborative content management system 130 displays the thread to the current user.

In some implementations, the @file primitive, in addition to signifying that a comment should be a file-level comment, signifies the audience of the comment should be the audience that would result from an @doc primitive. In some implementations, all file-level comments are given the audience that would result from an @doc primitive, regardless of whether the comment is associated with a primitive.

In addition to the collaborative content item audience primitive, other contextual primitives may be implemented:

The "@folder" primitive informs the collaborative content management system 130 that all users with access to the folder that includes the collaborative content item should be in the audience for the thread. In this case, some of the users that have access to the folder may not have access to the collaborative content item. In this case, the collaborative content management system 130 may grant all users with access to the folder access to the collaborative content item, provide a separate interface for users without access to the collaborative content item to view the thread, or it may provide the users without access to the collaborative content item with notifications regarding the thread over email.

The "@editing" primitive indicates that all users with editing access to the collaborative content item are to be included in the audience for a thread. The collaborative content management system 130 parses this in the same way as the "@doc" primitive. However, instead of retrieving all users associated with the collaborative content item in the collaborative content item index only users with editing access are added to the audience_list for the thread.

The "@ sharing" primitive (only users with sharing privileges are added to the audience_list) functionality is implemented in a similar manner.

The "@threads" primitive adds all users that have participated in threads in the collaborative content item already to the audience_list of the current thread. To accomplish this, upon detecting the "@threads" primitive the collaborative content management system 130 accesses each thread object associated with the collaborativeContentItemID and adds any users listed in the audience_list of those threads the audience list of the current thread.

The "@project <projectName>" primitive adds all users that have been included as members of the indicated projectName project, to the audience_list of the current thread. A project can be a collection of project items such as content items, content item references, other projects, and/or users. The collection of project items making up a project can be defined in the collaborative content management system 130. The collaborative content management system 130 can detect the "@project" primitive. In response, the collaborative content management system 130 can access and add a list of members for the projectName project to the audience_list of the current thread.

The "@group <groupName>" primitive adds all users that have been included as members of the indicated groupName user group to the audience_list of the current thread. To accomplish this, the collaborative content management system 130 can detect the "@group" primitive. In response, the collaborative content management system 130 can then access and add a list of members for the groupName group to the audience_list of the current thread.

Depending on the embodiment, the specific text string associated with the primitive may be different. A user may also define their own contextual primitive using the client application to select users, categories of users, and contextual categories of users to be included in the primitive. Additionally, and contextual primitive may be made dynamic using a special ID in the audience_list which triggers a reevaluation of the audience list during compilation of the collaborative content item.

Determining the Audience of a Thread

Generally, the audience is determined when a thread is created, and then is subsequently updated as additional comments are included in the thread and users are mentioned in the text of comments. FIG. 12 shows one embodiment of an algorithm for determining an audience for a content level thread.

Referring to FIG. 12, when a comment is created, the audience for a thread initially comprises the userID of the author of the collaborative content item containing the thread and the author of the first comment included in the thread. Accordingly, if a new thread is being created, the collaborative content management system 130 adds 1200 the userID of the collaborative content item author to audience. The collaborative content management system 130 adds 1202 the authorID of the comment author to the audience as well, if not already present in that list.

The audience for a thread also initially comprises the authors of any text included in the span for the thread if the thread is a content level thread i.e. if the isFilelevel element of the thread data structure is False. If the thread is a file-level thread then there is no associated span and so this step is skipped. If a user creates a content level comment covering a span of text that three other users have previously edited, then these other users are included in the audience for the thread. This is beneficial because these other users are the individuals most likely to be interested in the initial user's comment. Accordingly, the collaborative content management system 130 adds 1204 to the audience the userIDs of authors of any text portions that overlaps with the span for the thread, based on the author list for the collaborative content item. This step occurs both for a new comment and when a reply comment is created. As described above, the author list is a list of userIDs of users who edited text in the collaborative content item, and is coded as a sequence of (userID, span) pairs. For those userIDs for which the text portions that overlap with the span of the thread, the authors of such text portions are added to the audience for the thread. A text portion can overlap the span for a thread in different ways: (i) overlap the entire span; (ii) overlap the beginning of the span but not the end; (iii) overlap the end of the span but not the beginning; or (iv) fall entirely inside the span. These different types of overlaps can be identified by the following comparisons:

1) The text portion starts before the beginning of the span and ends at any point after the beginning of the span. This rule covers types (i) and (ii).

2) The text portion starts between the beginning and an ending of the span. This covers types (iii) and (iv).

For example, if the span for the thread starts at character position 5 and ends at position 50 in a collaborative content item, then the collaborative content management system 130 can traverse the author list and identify text portions that either i) start before position 5 and end after position 50; ii) start before position 5 and end between position 5 and position 50; iii) start between position 5 and end between position 50 and end after position 50; and iv) start and end between position 5 and position 50. The authors of these text portions would be included in the audience for the thread. Other sets of comparison rules that are equivalent can be derived.

The audience for a thread further preferably comprises any user mentioned in the span of the thread via a user primitive and any user mentioned in a comment via user primitive. Inclusion of mentioned users is beneficial since it enables others to quickly engage the mentioned users in collaborative on the collaborative content item, without having to communicate separately with such users via email, messaging, calendar invitations or like. For example, a first user can easily request a second user to review specific section of a collaborative content item simply by mentioning that the second user via a user primitive in a comment associated with the desired section. Comment 504d in FIG. 5 illustrates an example with the inclusion of the user primitive 520 of "@Bill_Seward" in the text of the comment.

Accordingly, the collaborative content management system 130 scans the span selected by the user and identifies user primitives of the form @username. The collaborative content management system 130 then looks up the userIDs for each username from the account database 316 using the account management module 304. These userIDs are added 1206 to the audience for the thread. Since changes in the content of the span can occur after the original thread is created, and these changes can introduce a user primitive, this step is performed each time a comment is added to a thread.

Additionally, the collaborative content management system scans 130 the span selected by the user and identifies any contextual primitives. In the case, of the "@doc" primitive shown in FIG. 5B is identified, the collaborative content management system 130 access the collaborative content item index of the collaborative content item database 408 using the collaborativeContentItemID of the collaborative content item and adds the userIDs included in the index to the audience of the thread. Other contextual primitives will correspond to different accesses to the collaborative content item database 408. or the user account database 316 as explained above.

The audience for a thread may also includes any user mentioned in the text of a comment via user primitive. This can also occur in the context of both a new thread, or a reply to a comment in an existing thread. Accordingly, the collaborative content management system 130 determines 1208 whether the text of the comment itself includes any user primitives. The collaborative content management system 130 then looks up the userIDs for each username from the account database 316 using the account management module 304. These userIDs are added to the audience for the thread. For example, referring back to FIG. 5A, the comment 504d created by the user George Bancroft would have as the audience the author of the collaborative content item and the user Bill_Seward (due to primitive "@Bill_Seward" appearing in the comment 504 itself). Contextual primitives located in the text of a comment are detected and treated in the same was as if they occurred in the span of the comment.

In the latter two cases, a user is included for the first time in the audience of a thread by virtue of being mentioned via user primitive (either in a recent edit to the span or in last received comment), the userID for this user will not appear in the notification elements of the previously received comments. Accordingly, when generating the notification messages, the collaborative content management system 130 will selectively include the prior comments that have not been previously sent to the user in the notification message.

FIG. 13 shows one embodiment of an algorithm for identifying an audience for a file-level thread. The algorithm for determining an audience for a file-level thread is similar to the algorithm for determining an audience for a comment level thread with minor differences. Primarily, content level threads do not include a text span and so step 1204 is not included in threads that are identified as having an isFileLevel element that is True. As such, the algorithm for determining an audience for a file-level thread begins by adding 1300 the userID of the author of the collaborative content item to the thread audience. Subsequently, like the algorithm for determining a content level thread audience, the collaborative content management system 130 adds 1302 the userID of the comment author to the audience if it is not already present in the audience. In some embodiments, upon creating a file-level comment the default audience is set to the audience that would result from the @doc primitive (or every user with viewing privileges for the collaborative content item). The collaborative content management system 130 then identifies 1304 user primitives and contextual primitives within the comment content of the new comment. For any user primitives identified in the comment content, the collaborative content management system 130 adds the corresponding userID for that user primitive to the thread audience. If a contextual primitive is identified, then the collaborative content management system 130 references the relevant list to determine the corresponding userIDs and adds them to the thread audience.

Finally, if no primitives have been detected, or there is still only an audience of one for the thread, the collaborative content management system 130 applies 1306 a default file-level thread audience and sets the thread audience equal to the default audience. In some embodiments, the default thread audience is equivalent to the audience that would result from the @doc contextual primitive, which includes users with access to view the document.

Displaying Content Items

Figure 14:
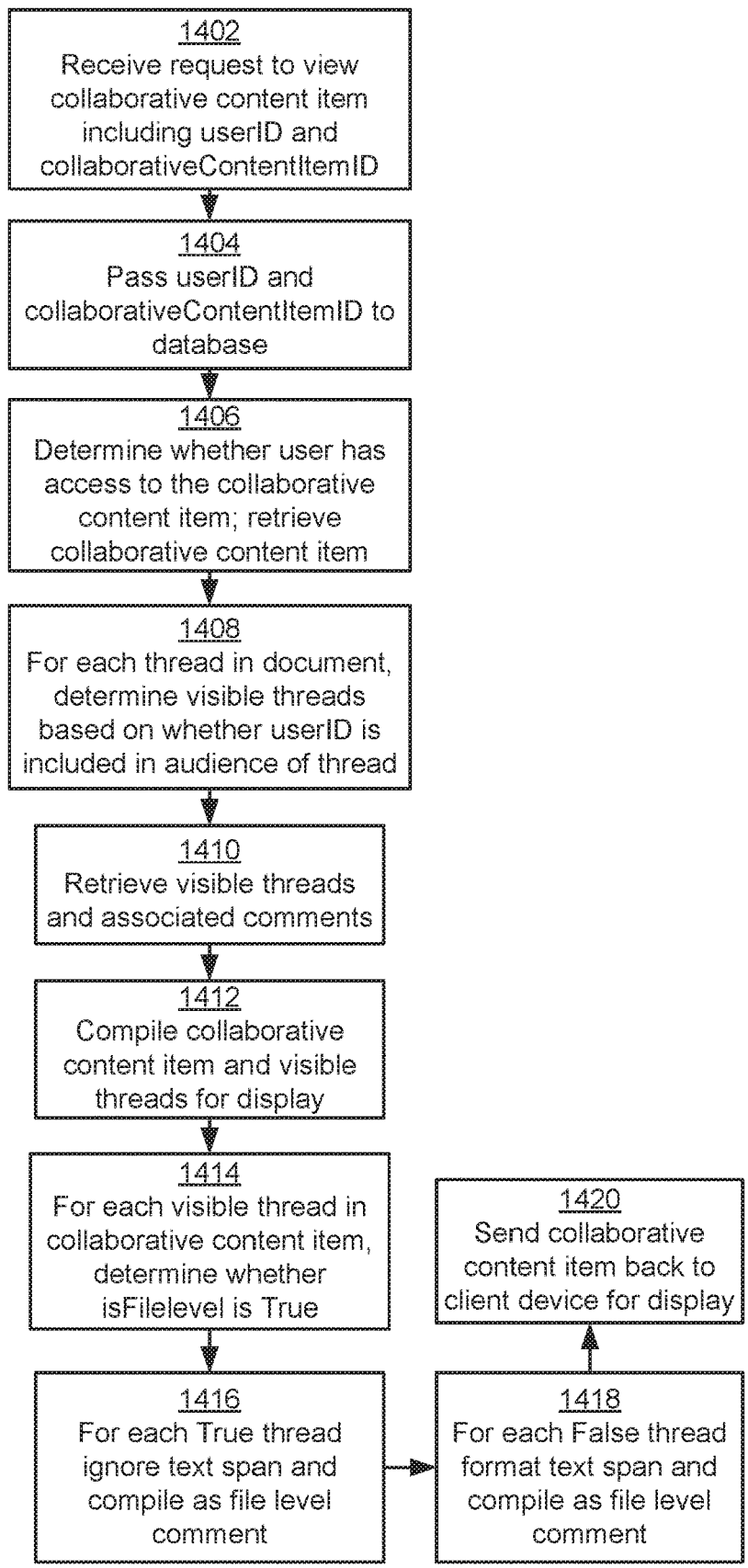
FIG. 14 shows one embodiment of an algorithm for selecting threads and comments to display to a user when providing a requested document.

FIG. 14 shows one embodiment of an algorithm for selecting which threads and comments to display to a user when providing a requested collaborative content item. When user accesses a collaborative content item, either through a web browser 260, a collaborative content editor 270, or the client application 200 of the client device 120, the collaborative content management system 130 receives 1402 a request to compile a collaborative content item including the userID for the user, and the collaborativeContentItemID for the collaborative content item from the client device 120 of the user. The collaborative content management system 130 passes 1404 the collaborativeContentItemID and the userID to the collaborative content item database 408. The collaborative content item database 408 looks up the collaborativeContentItemID to access the collaborative content item path to retrieve the collaborative content item.

From a collaborative content item index the collaborative content item database 408 determines 1406 whether the user has access to the collaborative content item, based on the userID and any authentication information. If so, the CCI database 408 retrieves and assembles elements of the collaborative content item from the database 408. In some implementations, collaborative content item database 408 evaluates the audience element of each thread to determine 1408 if the userID of the user is included in the audience element of the thread and, if the userID of the requesting user appears in the audience for a thread, then the thread and its comments will be visible to the user, otherwise the thread and its comments will not be visible initially. In some implementations, thread viewership is not restricted based on a thread audience, e.g. all users with permissions to open a collaborative content item or to view comments in the collaborative content item will see all the threads in that collaborative content item. If the thread is to be visible, the collaborative content item database 408 uses the list of commentIDs in the thread to retrieve 1410 the listed comments.

The visible threads and the collaborative content item content are returned to the collaborative content management system 130 which compiles 1412 the collaborative content item into displayable text (or provides the underlying data to the client application for rendering) by arranging the threads and comments in a sequence in the comment pane, such as illustrated in FIGS. 5A-5D. During collaborative content item compilation, the collaborative content management system 130 determines 1414 whether the isFilelevel element for each thread is True. For each thread with a True isFilelevel element, the span of the thread is ignored (no text other than optionally the title is formatted) and the thread is compiled 1416 as a file-level thread. The thread and/or the comments therein may be coded to be distinctively displayed with distinguishing graphical features or appearance. For each thread with a False isFilelevel element the collaborative content management system applies formatting to the text indicated by the span element of the thread and compiles 1418 as a content level thread. The compiled collaborative content item is then sent 1420 back to the client device, where it is displayed to the user.

Alternatively, the collaborative content management system 130 may identify file-level threads and content level threads using the FLThreadID_list and the ThreadID_list of the collaborative content item data structure respectively.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range.

Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. Moreover, claim language reciting 'at least one of' an element or another element refers to any possible permutation of the set of elements. For example, claim language reciting 'at least one of A and B' or 'at least one of A or B' means A, B, or both A and B.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Any patents, patent applications, and other references noted above are incorporated herein by reference. Aspects can be modified, if necessary, to employ the systems, functions, and concepts of the various references described above to provide yet further implementations. If statements or subject matter in a collaborative content item incorporated by reference conflicts with statements or subject matter of this application, then this application shall control.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A non-transitory computer-readable storage medium storing instructions that, when executed by a computing system, cause the computing system to perform operations comprising:
    identifying, in content to be included in a first comment, a file-level primitive input by a user, the file-level primitive indicating that the first comment is a file-level comment on a collaborative content item;
    responsive to identifying the file-level primitive, creating a reference between the collaborative content item as a whole and the first comment;
    receiving a request for the collaborative content item, and in response, generating a representation of the collaborative content item, wherein generating the representation of the collaborative content item comprises generating a representation of the first comment,
        wherein the representation of the first comment includes an indicator that the first comment is the file-level comment; and
    sending the representation of the collaborative content item for display.

2. The non-transitory computer-readable storage medium of claim 1, wherein generating the representation of the collaborative content item comprises:
    retrieving, based on the reference, a comment data structure corresponding to the first comment;
    determining that the first comment is the file-level comment based on a content level indicator in the comment data structure; and
    based on the determining that the first comment is the file-level comment, creating the indicator that the first comment is the file-level comment.

3. The non-transitory computer-readable storage medium of claim 1, wherein generating the representation of the collaborative content item further comprises generating a representation of a second comment by:
    retrieving, a comment data structure corresponding to the second comment;
    determining that the second comment is a content level comment based on a content level indicator in the comment data structure; and
    based on the determination that the second comment is a content level comment, including, in the representation of the collaborative content item, the representation of the second comment including a visual association between the representation of the second comment and a span of content in the collaborative content item, wherein the span of content is specified in the comment data structure.

4. The non-transitory computer-readable storage medium of claim 1, wherein the indicator that the first comment is the file-level comment includes highlighting, in association with the first comment, a title of the collaborative content item.

5. The non-transitory computer-readable storage medium of claim 1, wherein identifying the file-level primitive is performed by identifying, in the content to be included in the first comment, a signaling character sequence.

6. The non-transitory computer-readable storage medium of claim 1, wherein the instructions, when executed by the computing system, further cause the computing system to perform operations comprising:
    determining, based on the first comment being the file-level comment, an audience for a notification relating to the first comment, wherein determining the audience includes:
        identifying one or more users who have viewed the collaborative content item; or
        identifying one or more users who have interacted with the collaborative content item; and
    sending the notification to the determined audience.

7. A computer system comprising:
    one or more processors; and
    at least one memory storing instructions that, when executed by the one or more processors, cause the computer system to:
        receive a command to create a new comment at a file-level for a collaborative content item, wherein the command is to create the new comment at the file-level due to a title of the collaborative content item being selected by a user when the command was received;
        responsive to receiving the command, create a reference between the collaborative content item as a whole and a first comment;
        receive a representation of the collaborative content item, the representation of the collaborative content item including a file-level comment corresponding to the new comment; and send for display the representation of the collaborative content item including a first association between the file-level comment and the title of the collaborative content item, the first association being based on the reference.

8. The computer system of claim 7, wherein sending for display the representation of the collaborative content item further comprises showing a second association between a content-level comment and a span in the collaborative content item other than the title.

9. The computer system of claim 7, wherein the instructions, when executed by the one or more processors, further cause the computer system to:
send a modification to the title of the collaborative content item;
receive a second representation of the collaborative content item, the second representation of the collaborative content item including the file-level comment; and
send for display the second representation of the collaborative content item by including a second association between the file-level comment and a designated title location within the collaborative content item.

10. The computer system of claim 9, wherein the modification to the title comprises deleting the title of the collaborative content item.

11. The computer system of claim 7, wherein the first association between the file-level comment and the title of the collaborative content item includes a correspondence in highlighting between the file-level comment and the title of the collaborative content item.

12. The computer system of claim 7, wherein the file-level comment is included in a comment pane amongst content-level comments, wherein the displayed representation of the collaborative content item shows both the comment pane and content of the collaborative content item.

13. The computer system of claim 7,
wherein the representation of the collaborative content item is part of a list of collaborative content item representations;
wherein the list of collaborative content item representations includes a comment pane; and
wherein the comment pane is configured to show the file-level comment associated with the collaborative content item when the collaborative content item is selected in the list of collaborative content item representations.

14. A non-transitory computer-readable storage medium storing instructions that, when executed by a computing system, cause the computing system to perform operations comprising:
receiving, from a first client device based on input by a user, a sharing action for a collaborative content item, the sharing action including a sharing message; and
responsive to receiving the sharing action, creating a reference, between the collaborative content item as a whole and a first comment, wherein the first comment is associated with comment content comprising the sharing message, and wherein the reference is associated with a file-level indicator that specifies that the first comment corresponds to a file as a whole.

15. The non-transitory computer-readable storage medium of claim 14,
wherein the sharing action includes a list of one or more recipients to which the sharing message is to be sent; and
wherein the instructions, when executed by the one or more processors, further cause the computing system to perform operations comprising, responsive to receiving the sharing action, sending the sharing message to the one or more recipients in the list of recipients.

16. The non-transitory computer-readable storage medium of claim 15, wherein the sharing message further includes an identifier representing the collaborative content item, and wherein the instructions, when executed by the one or more processors, further cause the computer system to perform operations comprising:
receiving a reply message to the sharing message, the reply message including the identifier representing the collaborative content item and reply content; and
responsive to receiving the reply message:
creating a second comment that includes the reply content; and
associating the first comment and the second comment such that, when a representation of the collaborative content item is created, a representation of the second comment is indicated as a reply to the first comment.

17. The non-transitory computer-readable storage medium of claim 15,
wherein the sharing message (A) is configured to be delivered to one or more recipients and (B) includes a reply address, the reply address indicating:
a message processing system associated with the system, and
an identifier of the first comment;
wherein a reply message is received at the system using the reply address; and
wherein the instructions, when executed by the one or more processors, further cause the computing system to perform operations comprising associating, based on the identifier of the first comment, the reply message with the first comment as a reply comment.

18. The non-transitory computer-readable storage medium of claim 14, wherein the instructions, when executed by the one or more processors, further cause the computing system to perform operations comprising:
receiving a request for the collaborative content item from a second client device, and in response, generating a representation of the collaborative content item including a representation of the first comment, the representation of the first comment including an indicator that the first comment is a file-level comment; and
in response to the request for the collaborative content item, providing the representation of the collaborative content item for display on the second client device.

19. The non-transitory computer-readable storage medium of claim 14, wherein creating the reference between the collaborative content item and the first comment is further in response to determining that a setting is associated with the sharing message, the setting indicating that the sharing message should be added as a file-level comment on the collaborative content item.

20. The non-transitory computer-readable storage medium of claim 14, wherein the instructions, when executed by the one or more processors, further cause the computing system to perform operations comprising:
receiving a request for a collection of collaborative content items, the collection of collaborative content items including the collaborative content item; and
generating a view of the collection of collaborative content items, the view including a representation of the collaborative content item and a comment pane, wherein the comment pane is configured to show representations of file-level comments associated with the collaborative content item, including the representation of the first comment, when the representation of the collaborative content item is selected.

* * * * *

UNITED STATES PATENT AND TRADEMARK OFFICE
CERTIFICATE OF CORRECTION

PATENT NO. : 10,791,071 B2
APPLICATION NO. : 16/577225
DATED : September 29, 2020
INVENTOR(S) : Christina Cacioppo et al.

Page 1 of 1

It is certified that error appears in the above-identified patent and that said Letters Patent is hereby corrected as shown below:

In the Claims

Column 34, Claim 16, Line 8, delete "further cause the computer system" and insert --further cause the computing system--.

Signed and Sealed this
Eighth Day of December, 2020

Andrei Iancu
*Director of the United States Patent and Trademark Office*